J. C. ROSS.
REVERSING MECHANISM.
APPLICATION FILED FEB. 19, 1909.
941,275.
Patented Nov. 23, 1909.
2 SHEETS—SHEET 2.
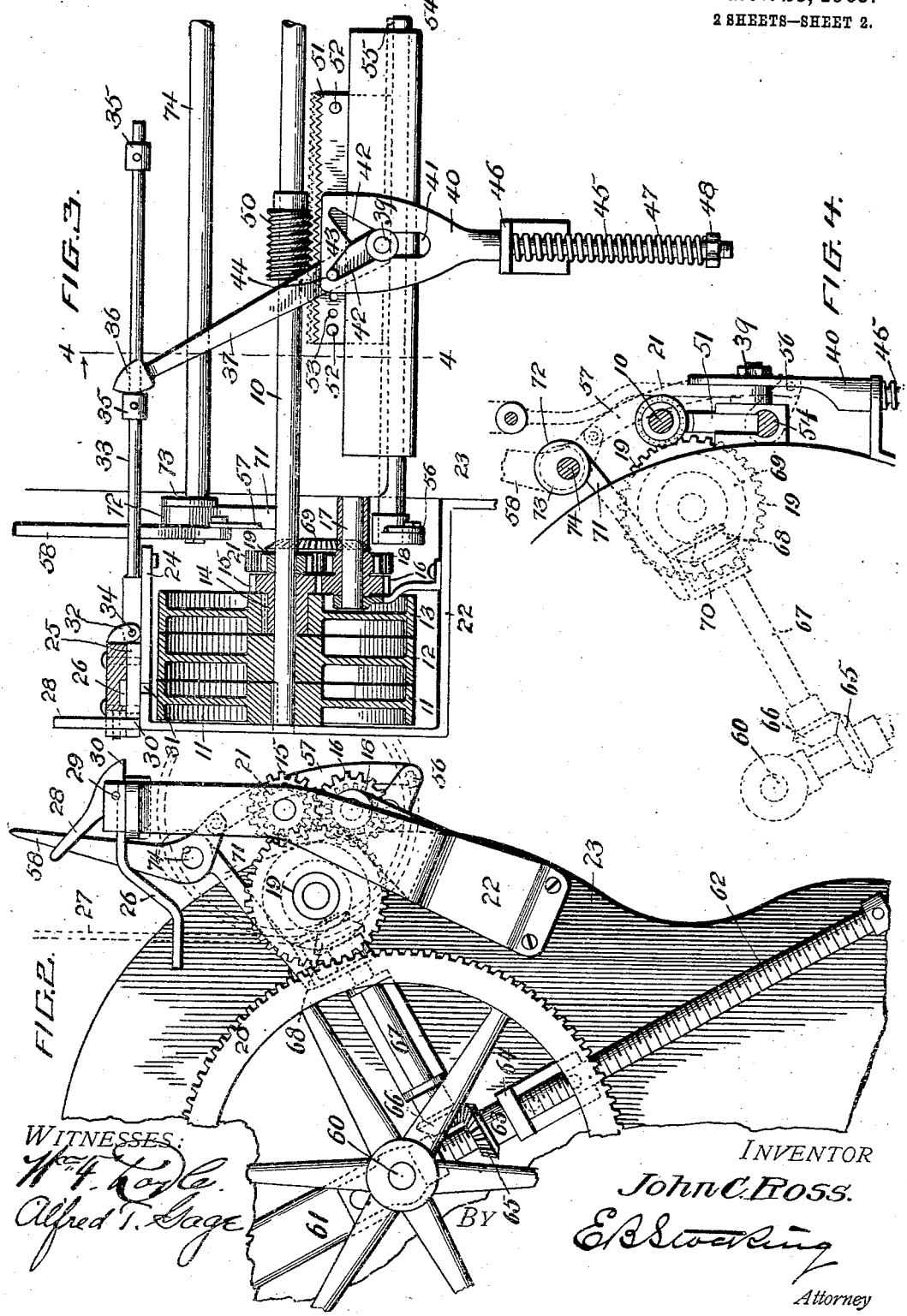
WITNESSES:
INVENTOR
John C. Ross.
BY
Attorney

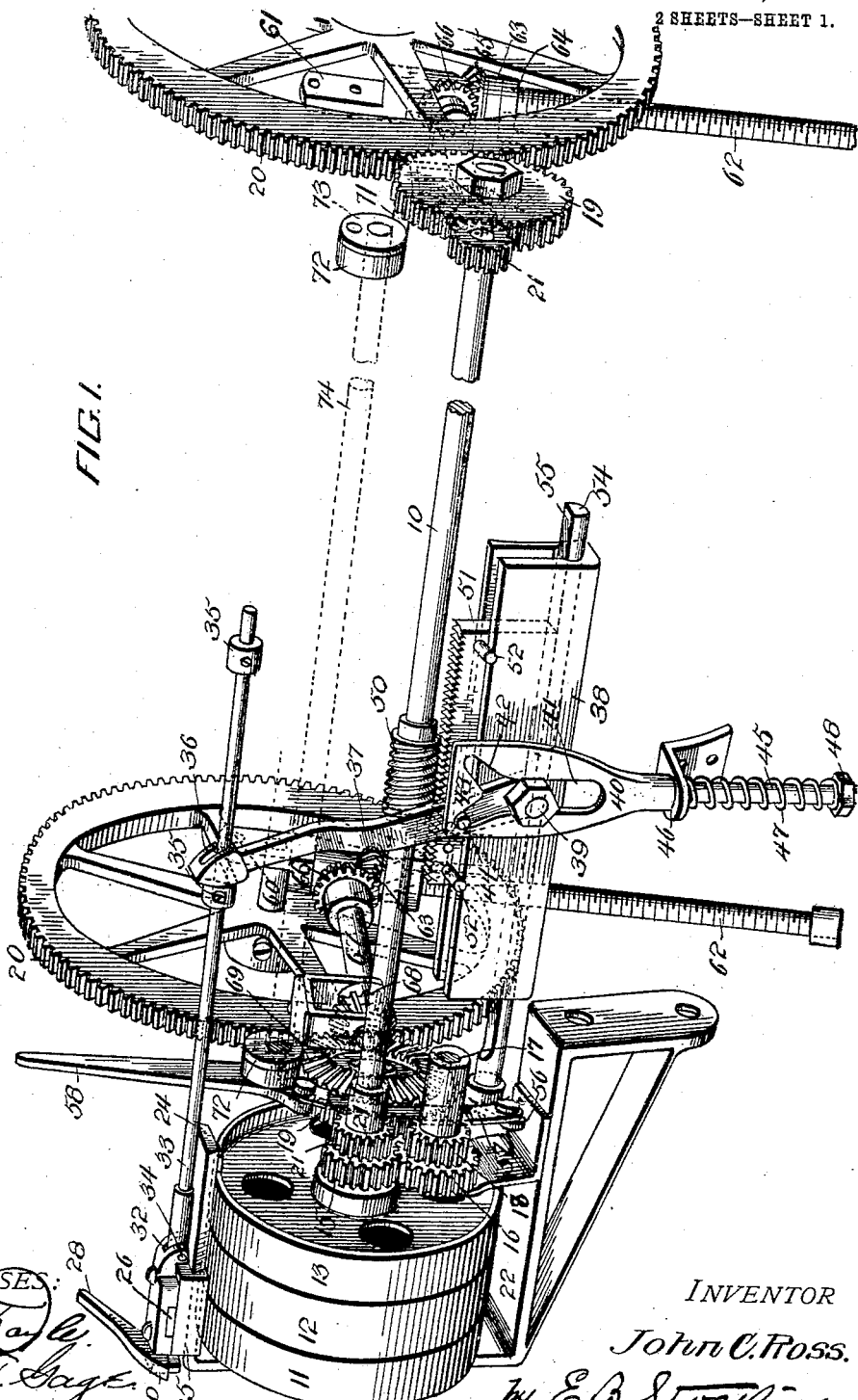

UNITED STATES PATENT OFFICE.

JOHN C. ROSS, OF BUTTE, MONTANA.

REVERSING MECHANISM.

941,275.  Specification of Letters Patent.  Patented Nov. 23, 1909.

Application filed February 19, 1909. Serial No. 478,829.

*To all whom it may concern:*

Be it known that I, JOHN C. ROSS, citizen of the United States, residing at Butte, county of Silverbow, and State of Montana, have invented certain new and useful Improvements in Reversing Mechanism, of which the following is a specification, reference being had therein to the accompanying drawing.

This invention relates to a reversing gearing, and particularly to a mechanism comprising driving pulleys and a belt adapted to rotate a main shaft in opposite directions together with means carried by said main shaft for shifting a single belt relative to said pulleys for reversing the direction of drive of said shaft, and comprises a division in part of my application Serial No. 433,450, filed May, 18, 1908.

The invention has for an object to provide upon the main shaft direct and reverse driving pulleys together with a belt shifter and means carried by said shaft to automatically operate said shifter and thus secure a drive of said shaft in opposite directions by means of a single belt.

A further object of the invention is to provide a shifter lever coöperating with a slide bar driven by the main shaft to actuate said lever and means for retaining said lever under tension in its shifted position.

Another object of the invention is to provide means by which the automatic reversing mechanism may be disconnected from the main shaft and the motion thereof transmitted in one direction for driving another mechanism.

Other and further objects and advantages of the invention will be hereinafter fully set forth and the novel features thereof defined by the appended claims.

In the drawing:—Figure 1 is a perspective view of the driving mechanism; Fig. 2 is an end elevation thereof; Fig. 3 is a longitudinal section of the driving connections at the left of Fig. 1; and Fig. 4 is a vertical section on line 4—4, of Fig. 3.

The numeral 10 designates the main shaft of the mechanism which is provided with a pulley 11 secured thereto and with the parallel pulley 12 loosely mounted thereon. Upon this shaft 10 a reversing pulley 13 is also mounted and is secured to a sleeve 14 rotatably mounted upon the shaft and having a gear 15 which meshes with the companion gear 16 secured to the countershaft 17, this shaft also being provided with the gear 18 for transmitting motion in a reverse direction to the parts to be driven, through the pinion 19 which in turn meshes with the driving gear 20 upon the shaft of any desired mechanism. The shaft 10 is also provided with the direct driving gear 21 secured thereto and also meshing with the pinion 19. The gears 21, 19 and 20 are in the illustration given duplicated at opposite ends of the mechanism.

The driving shaft 10 is supported in a suitable bracket 22 extending from the main frame 23 of the machine to which it is applied. The upper arm 24 of this bracket has the belt shifting block 25 slidingly mounted thereon and may be connected therewith by a dovetail connection, as shown in Fig. 1. This block carries the shifting loop 26 through which the belt 27 passes, as shown in Fig. 2. The block is also provided with a hand hold 28 by which it may be shifted independent of the automatic shifting mechanism. This hold is pivotally mounted at 29 thereon and the toe 30 thereof adapted to seat in a recess 31 formed in the arm 24 by which means the block may be locked in adjusted position so as to secure a continuous driving in one direction. The block 25 is also provided with a bifurcated connection 32 adapted to receive one end of the shifting rod 33 which is pivoted at 34 therein. The opposite end of this rod is provided with tappets 35 and passes through the upper end 36 of the shifting lever 37. The end of this lever is provided with an elongated slot to permit the oscillatory movement thereof relative to the reciprocation of the rod 33. The lever is mounted at its lower end upon a casing 38 by means of the pivot 39. In order to retain this lever in either of its shifted positions a tension device is provided and for that purpose in the present illustration comprises the plate 40 having the vertically disposed way 41 and the bifurcated ways 42 at the upper portion thereof. Intermediate of the ways 42 the V-shaped portion 43 of the plate provides an inclined shifting face coöperating with the pin or projection 44 carried by the lever 37. The plate 40 at its lower end is formed with a stem 45 extending through the fixed bracket 46 and provided with the tension spring 47 which may be adjusted by means of the nut 48 upon this stem. It will be observed that in the shifting of the rod this lever 37 is rocked and by riding upon the inclined surfaces 43 is held under tension in either of its shifted positions.

When it is desired to apply the gearing to a mechanism in which it is wished to impart rotation successively in opposite directions, such as a washing machine, means for automatically shifting the direction of rotation may be applied by a preferred form thereof, as herein shown, and comprises a worm gear 50 secured to the main shaft 10 and adapted to mesh with the rack bar 51 mounted in the casing 38 to slide therein. This bar is provided at opposite ends with pins or projections 52 which may be adjusted by a series of holes 53 therein, and in the travel of the bar these projections engage and move the lever 37 to shift the belt. The upper surface of the bar is provided with a worm rack or teeth to be actuated by the rotation of the worm in its movement in either direction. Under some conditions it is desirable to continue the rotation in a single direction and for this purpose the bar 51 is mounted upon the cam shaft 54 which in the position shown in Fig. 1 has its straight face 55 upward and supports the bar 51 in a position removed from the actuating worm. When this shaft is partially rotated the bar is raised into engagement with the rack and driven thereby. This rotation may be secured by any desired means, for instance, the crank arm 56 carried by one end thereof, this arm being connected by the link 57 (Fig. 2) carried by the shifting lever 58.

In the application of the invention shown the driving gear 20 is disposed upon the shaft 60 of a machine, such as a washing machine, for rotating the same in either one or alternately opposite directions, and in the operation of such a machine it is desirable to raise the cylinder thereof from its casing by a direct movement in one direction and this may be accomplished by mounting the shaft 60 in a sliding bearing 61 which is provided with an extended screw 62 mounted thereon and threaded through the drive nut 63 mounted in contact with the bracket 64 upon the casing 23. This nut is formed with a bevel gear 65 meshing with a coöperating gear 66 carried by the shaft 67 which shaft upon its opposite end is provided with a shiftable gear 68 meshing with the bevel gear 69 carried upon one face of the gear 19. The gear 68 is slidingly secured to the shaft 67 and adapted to be shifted thereon into and out of mesh with the bevel gear 69 by means of the yoke 70 embracing the gear 68 and having an arm 71 provided with an eccentric sleeve 72 adapted to embrace an eccentric 73 carried by the shaft 74 extending longitudinally to the opposite ends of the machine where these connections are duplicated. This shaft 74 is connected to the lever 58 so that when the shaft is shifted to connect the mechanism for removing the cylinder from the casing, the reversing rack is thrown out of operative position, and the driving connections communicated from the gearing upon the main shaft 10 directly to the screw for shifting the shaft of the gear 20.

In the operation of the invention it will be apparent that when the belt is in direct driving position upon the pulley secured to the main shaft and the reversing bar thrown into contact with the worm on said shaft, the driving will continue in one direction until the projection or pin upon the bar engages the shifting lever and throws it in the opposite direction which movement is assisted beyond the center of travel by the tension device connected with the lever, and the belt is thus shifted positively from the direct driving pulley to the reverse driving pulley whose extended hub is geared to reverse the direction of drive transmitted to the machine. If it be desired to stop the driving movement the belt may be shifted by hand to the central loose pulley and secured thereon by means of the lever engaging the locking recess in the supporting bracket upon which the shifting block slides. If it be desired to continue the movement in one direction the automatic reversing mechanism may be thrown out by means of the shifting lever, while this lever is also adapted to control the shifting of the gears by which the screw may be driven for actuating another part of the mechanism, such as the sliding movement of the shaft carrying the driving gear 20. This is effected through the medium of the cam shaft beneath the bar engaging the worm of the driving shaft, and the mechanism shown provides means by which the driving of the machine may be automatically reversed in direction at predetermined intervals or continuously driven in one direction, or by which the driving motion of the shaft may be transmitted to other mechanism when the reversal in direction is discontinued.

The tension device provided for the shifting lever causes a positive movement thereof to the full extent to secure the shifting of the belt from the direct driving to the reverse driving pulley. This construction requires the use of only a single belt and dispenses with the crossed belt ordinarily used as the reverse direction of travel is fully controlled by the gear sleeved upon the shaft for that purpose.

The invention while shown in connection with mechanism for a washing machine is applicable to any class of machine where it is desired to perform the same function.

Having described my invention and set forth its merits, what I claim and desire to secure by Letters Patent is:—

1. In a reversing mechanism, a main shaft, direct and reverse driving pulleys mounted thereon, a belt, a belt shifting device coöperating with said belt, means carried by said shaft to automatically operate said device, and means for disconnecting said shifting device.

2. In a reversing mechanism, a main shaft, direct and reverse driving pulleys mounted thereon, a belt, a belt shifting device coöperating with said belt, means carried by said shaft to automatically operate said device, means for disconnecting said shifting device, an independent operating shaft, and means operated by the disconnecting means for throwing said independent shaft into gear with the driving shaft as the shifting device is disconnected therefrom.

3. In a reversing mechanism, a main shaft, direct and reverse driving pulleys mounted thereon, a belt, a belt shifting device coöperating with said belt, a lever connected with said shifting device, and a slide bar driven from said shaft and having projections at opposite ends adapted to contact with said lever.

4. In a reversing mechanism, a main shaft, direct and reverse driving pulleys mounted thereon, a belt, a belt shifting device coöperating with said belt, a lever connected with said shifting device, a slide bar driven from said shaft and having projections at opposite ends adapted to contact with said lever, and a spring actuated plate engaging the lever for retaining said lever under tension in its shifted position.

5. In a reversing mechanism, a main shaft, direct and reverse driving pulleys mounted thereon, a belt, a belt shifting device coöperating with said belt, a lever connected with said shifting device, a slide bar driven from said shaft and having projections at opposite ends adapted to contact with said lever, and a tension plate having oppositely inclined faces adapted to engage said lever.

6. In a reversing mechanism, a main shaft, direct and reverse driving pulleys mounted thereon, a belt, a belt shifting device coöperating with said belt, a lever connected with said shifting device, a slide bar driven from said shaft and having projections at opposite ends adapted to contact with said lever, a plate having a slot with oppositely inclined faces, a projection from said lever adapted to ride in contact with said faces, and a tension spring adapted to hold said plate in contact with said projection.

7. In a reversing mechanism, a driving shaft, a belt, a pulley secured to said shaft, a parallel pulley loosely mounted thereon, a reversing pulley thereon, a gear secured to said reversing pulley, a belt shifter mounted to coöperate with said belt, a supporting arm for said belt shifter, and a hand lever mounted upon said shifter to engage a portion of said arm to lock the shifter in position.

8. In a reversing mechanism, a driving shaft, a belt, a pulley secured to said shaft, a parallel pulley loosely mounted thereon, a reversing pulley thereon, a gear secured to said reversing pulley, a belt shifter mounted to coöperate with said belt, a supporting arm for said belt shifter, a locking device carried by said shifter to engage said arm, a rod extended from said shifter, opposite tappets thereon, a pivoted reversing lever mounted to engage said tappets, and means for operating said lever.

9. In a reversing mechanism, a driving shaft, a belt, a pulley secured to said shaft, a parellel pulley loosely mounted thereon, a reversing pulley thereon, a gear secured to said reversing pulley, a belt shifter mounted to coöperate with said belt, a supporting arm for said shifter, a rod extended from said shifter, opposite tappets thereon, a pivoted reversing lever mounted to engage said tappets, a worm upon said driving shaft, a toothed slide bar coöperating with said worm, and means at each end of said slide bar to engage said lever.

10. In a reversing mechanism, a driving shaft, a belt, a pulley secured to said shaft, a parallel pulley loosely mounted thereon, a reversing pulley thereon, a gear secured to said reversing pulley, a belt shifter mounted to coöperate with said belt, a supporting arm for said belt shifter, a rod extended from said shifter, opposite tappets thereon, a coöperating reversing lever, a worm upon said driving shaft, a slide bar coöperating with said worm, and adjustable means on said slide bar to engage said lever.

11. In a reversing mechanism, a driving shaft, a belt, a pulley secured to said shaft, a parallel pulley loosely mounted thereon, a reversing pulley thereon, a gear secured to said reversing pulley, a belt shifter mounted to coöperate with said belt, a supporting arm for said belt shifter, a rod extended from said shifter, opposite tappets thereon, a coöperating reversing lever, a worm upon said driving shaft, a slide bar coöperating with said worm, means on said slide bar to engage said lever, and means for moving said slide bar toward the worm on said driving shaft.

12. In a reversing mechanism, a driving shaft, a belt, a pulley secured to said shaft, a parallel pulley loosely mounted thereon, a reversing pulley thereon, a gear secured to said reversing pulley, a belt shifter mounted to coöperate with said belt, a supporting arm for said belt shifter, a rod extended from said shifter, opposite tappets thereon, a pivoted reversing lever mounted to engage said tappets, a worm upon said driving shaft, a slide bar coöperating with said worm, means on said slide bar to engage said lever, and a cam shaft disposed beneath said slide bar to move the same toward said worm.

13. In a reversing mechanism, a driving shaft, a belt, a pulley secured to said shaft, a parallel pulley loosely mounted thereon, a reversing pulley thereon, a gear secured to said reversing pulley, a belt shifter mounted to coöperate with said belt, a supporting arm for said belt shifter, a rod extended from said shifter, opposite tappets thereon, a pivoted reversing lever mounted to engage said tappets, a worm upon said driving shaft, a slide bar coöperating with said worm, means on said slide bar to engage said lever, a cam shaft disposed beneath said slide bar to move the same toward said worm, a crank arm from said cam shaft, and an operating lever connected with said arm.

14. In a reversing mechanism, a main shaft, means for driving the same in opposite directions, power shifting means connected to said driving means and actuated by said shaft, a machine shaft geared to said main shaft, and mechanism connected to said main shaft for shifting said machine shaft laterally.

15. In a reversing mechanism, a main shaft, means for driving the same in opposite directions, power shifting means connected to said driving means and actuated by said shaft, a machine shaft geared to said main shaft, mechanism connected to said main shaft for shifting said machine shaft laterally, and connections to simultaneously control the power shifting means and said mechanism.

16. In a reversing mechanism, a driving shaft, a worm driven thereby, a rack bar meshing with said worm, a retaining lever, means upon said bar for moving said lever in opposite directions, a reversing device for said driving shaft connected to said lever, and a cam shaft for moving said rack bar into mesh with said worm.

17. In a reversing mechanism, a driving shaft, a worm driven thereby, a rack bar meshing with said worm, a retaining lever, means upon said bar for moving said lever in opposite directions, a reversing device for said driving shaft connected to said lever, a casing in which said bar is slidingly mounted, and a cam shaft disposed in the casing beneath said bar.

18. In a reversing mechanism, a driving shaft, a worm driven thereby, a rack bar meshing with said worm, a retaining lever, means upon said bar for moving said lever in opposite directions, a reversing device for said driving shaft connected to said lever, a tension plate having oppositely inclined faces to contact with a portion of said lever and mounted to slide upon the pivot thereof and a spring carried by said plate to retain said lever and faces in contact.

19. In a reversing mechanism, a driving shaft, a worm driven thereby, a rack bar meshing with said worm, a retaining lever, means upon said bar for moving said lever in opposite directions, a reversing device for said driving shaft connected to said lever, a supporting bracket, a tension plate having oppositely inclined contact faces and a depending shank, extending through said bracket, and a tension spring disposed between the under face of said bracket and the end of said shank.

20. In a reversing mechanism, a driving shaft, a direct driving gear thereon, a pulley secured to said shaft, a parallel pulley loosely mounted thereon, a reversing gear having a sleeve upon said shaft, a reversing pulley secured to said sleeve, a counter shaft, a gear sleeved thereon and meshing with the reversing gear, a transmitting gear on said countershaft, a driving pinion meshing with said transmitting gear and the gear on the driving shaft, a gearing comprising a shaft and a gear mounted thereon, and a coöperating gear rotatable with said driving pinion.

21. In a reversing mechanism, a driving shaft, a direct driving gear thereon, a pulley secured to said shaft, a parallel loose pulley mounted thereon, a reversing gear having a sleeve upon said shaft, a reversing pulley secured to said sleeve, a countershaft, a gear sleeved thereon and meshing with the reversing gear, a transmitting gear on said countershaft, a driving pinion meshing with said transmitting gear and the gear on the driving shaft, a gearing comprising a shaft and a gear mounted thereon, a coöperating gear rotatable with said driving pinion, and means for shifting one of said last mentioned gears toward and from the other.

22. In a reversing mechanism, a driving shaft, a direct driving gear thereon, a pulley secured to said shaft, a parallel loose pulley mounted thereon, a reversing gear having a sleeve upon said shaft, a reversing pulley secured to said sleeve, a countershaft, a gear sleeved thereon and meshing with the reversing gear, a transmitting gear on said countershaft, a driving pinion meshing with said transmitting gear and the gear of the driving shaft, a gearing comprising a shaft and a bevel gear mounted thereon, a coöperating bevel pinion rotatable with said driving pinion, a yoke embracing said bevel gear and having an extended arm, an eccentric sleeve thereon, an eccentric disposed within said sleeve, and means for shifting said eccentric.

23. In a reversing mechanism, a driving shaft, a direct driving gear thereon, a pulley secured to said shaft, a parallel loose pulley mounted thereon, a reversing gear having a sleeve upon said shaft, a reversing pulley secured to said sleeve, a countershaft, a belt coöperating with said pulleys, a gear sleeved thereon and meshing with the reversing gear, a transmitting gear on said countershaft, a driving pinion meshing with said transmitting gear and the gear on the driving shaft, a gearing comprising a shaft and a bevel gear mounted thereon, a coöperating bevel pinion rotatable with said driving pinion, a yoke embracing said bevel gear and having an extended arm, an eccentric sleeve thereon, an eccentric disposed within said sleeve, means for shifting said eccentric, power shifting means coöperating with said belt and automatically operated from said driving shaft, and means carried by the eccentric operating means for disconnecting the driving shaft from said power shifting means.

In testimony whereof I affix my signature in presence of two witnesses.

JOHN C. ROSS.

Witnesses:
 Ed Colgan,
 Henry Karry.